US012153278B2

(12) United States Patent
Hubert et al.

(10) Patent No.: US 12,153,278 B2
(45) Date of Patent: Nov. 26, 2024

(54) WELDED BRACKET STRUCTURE FOR A MULTI-CAMERA SYSTEM

(71) Applicant: Apple Inc., Cupertino, CA (US)

(72) Inventors: Aurelien R. Hubert, San Jose, CA (US); Stoyan P. Hristov, San Jose, CA (US); Xiao Liao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,167

(22) Filed: Mar. 23, 2023

(65) Prior Publication Data

US 2023/0228965 A1    Jul. 20, 2023

Related U.S. Application Data

(63) Continuation of application No. 16/825,521, filed on Mar. 20, 2020, now Pat. No. 11,640,039.

(60) Provisional application No. 62/826,657, filed on Mar. 29, 2019.

(51) Int. Cl.
*G02B 7/02* (2021.01)
*G03B 17/02* (2021.01)
*H04N 23/45* (2023.01)
*H04N 23/51* (2023.01)
*H04M 1/02* (2006.01)

(52) U.S. Cl.
CPC ............ *G02B 7/021* (2013.01); *G03B 17/02* (2013.01); *H04N 23/45* (2023.01); *H04N 23/51* (2023.01); *H04M 1/0264* (2013.01)

(58) Field of Classification Search
CPC .... G02B 7/021; G03B 17/02; G03B 2215/05; G03B 2217/002; G03B 35/08; H04M 1/0264; H04N 23/45; H04N 23/51
See application file for complete search history.

(56) References Cited

U.S. PATENT DOCUMENTS

| 7,271,511 | B2 | 9/2007 | Osaka |
| 2012/0075519 | A1 | 3/2012 | Blasch |
| 2014/0267882 | A1 | 9/2014 | O'Neill et al. |
| 2017/0263515 | A1 | 9/2017 | Bolognia et al. |
| 2018/0348469 | A1 | 12/2018 | Son et al. |

(Continued)

FOREIGN PATENT DOCUMENTS

| CN | 103095974 | 5/2013 |
| CN | 103713447 | 4/2014 |

(Continued)

OTHER PUBLICATIONS

Office Action and Search Report Mailed Dec. 9, 2023 from Chinese Patent Application No. 202210559420.8, Apple Inc., pp. 1-11.

*Primary Examiner* — Antoinette T Spinks
(74) *Attorney, Agent, or Firm* — Robert C. Kowert; Kowert, Hood, Munyon, Rankin & Goetzel, P.C.

(57) ABSTRACT

Various embodiments include a welded bracket structure for camera modules and techniques for forming such a welded bracket structure. In some embodiments, the welded bracket structure may include a first bracket and a second bracket that are welded to each other. Some embodiments include a weld joint arrangement comprising one or more weld joints for attaching the first bracket to the second bracket. Furthermore, some embodiments include an epoxy arrangement for a multi-camera system that includes the welded bracket structure and multiple camera modules.

20 Claims, 8 Drawing Sheets

(56) References Cited

U.S. PATENT DOCUMENTS

| | | |
|---|---|---|
| 2019/0250312 A1 | 8/2019 | Moon et al. |
| 2020/0310072 A1 | 10/2020 | Hubert et al. |
| 2022/0151087 A1* | 5/2022 | Hillman ................ G09F 9/3026 |

FOREIGN PATENT DOCUMENTS

| | | | | |
|---|---|---|---|---|
| CN | 107561825 | | 1/2018 | |
| CN | 207316382 | | 5/2018 | |
| CN | 207316382 U | * | 5/2018 | |
| CN | 208027061 | | 10/2018 | |
| CN | 109076150 | | 12/2018 | |
| CN | 208334752 | | 1/2019 | |
| CN | 208540011 | | 2/2019 | |
| CN | 208540011 U | * | 2/2019 | |
| EP | 2555526 | | 2/2013 | |
| EP | 2924501 | | 9/2015 | |
| EP | 2924501 B1 | * | 9/2016 | ............ G03B 17/02 |
| WO | 2018052228 | | 3/2018 | |

* cited by examiner

WELDED BRACKET STRUCTURE FOR A MULTI-CAMERA SYSTEM

This application is a continuation of U.S. application Ser. No. 16/825,521, filed Mar. 20, 2020, which claims benefit of priority to U.S. Provisional Application Ser. No. 62/826,657, filed Mar. 29, 2019, which are hereby incorporated by reference herein in their entirety.

BACKGROUND

Technical Field

This disclosure relates generally to a welded bracket structure for a multi-camera system.

Description of the Related Art

The advent of small, mobile multipurpose devices such as smartphones and tablet or pad devices has resulted in a need for high-resolution, small form factor cameras for integration in the devices. Some devices may include a multi-camera system that includes cameras held in place by a bracket formed of a single piece of material.

Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

Figure 1:
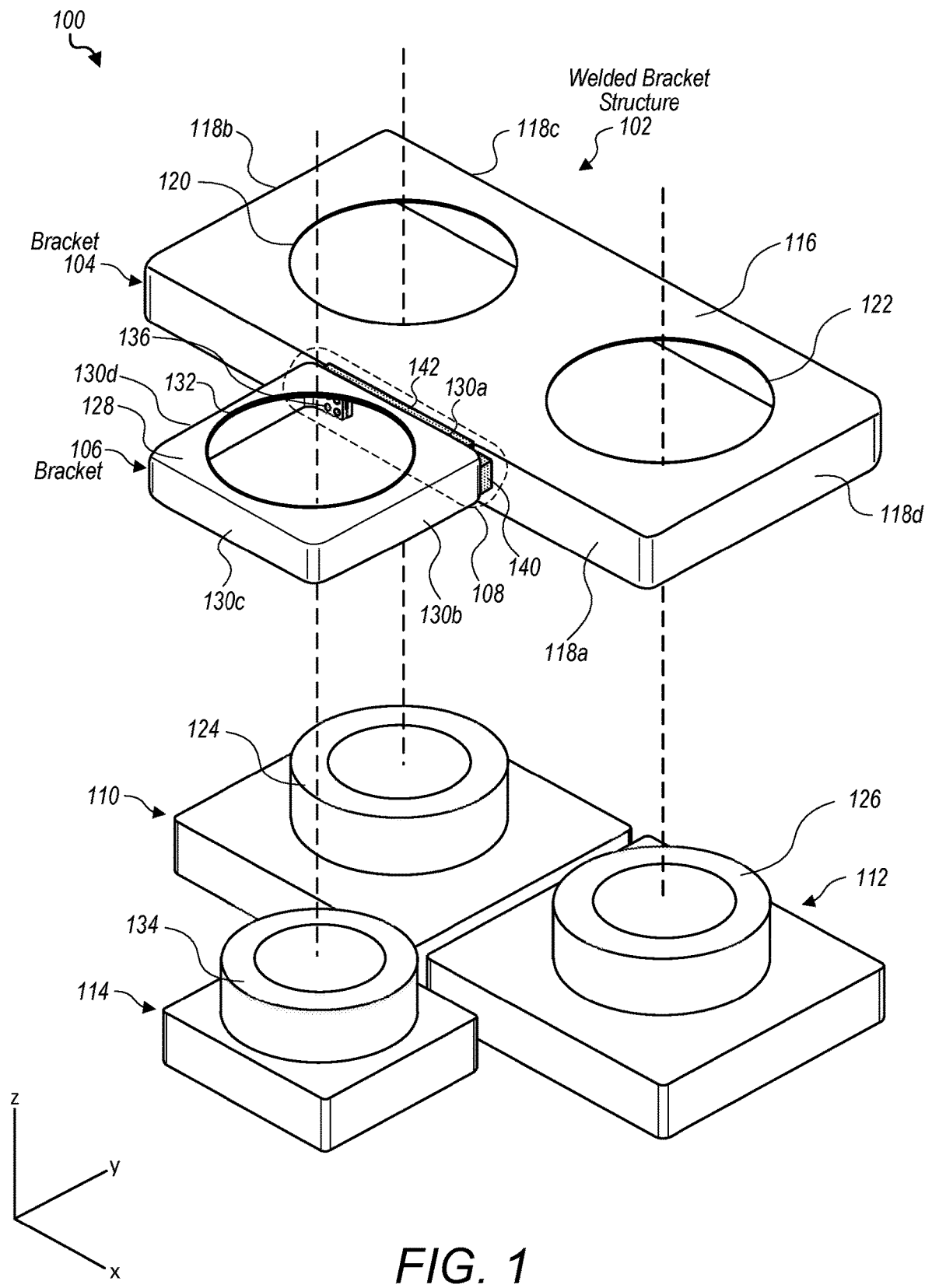
FIG. 1 illustrates a top perspective view of an example system that includes an example welded bracket structure for camera modules, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a welded bracket structure for use in conjunction with multiple camera modules. In some examples, the welded bracket structure may provide a unitary body structure to which camera modules may be attached or otherwise coupled, e.g., to form a multi-camera system module that may be incorporated into a device, such as a phone or other computing device. The welded bracket structure may comprise at least two brackets that are welded together via one or more weld joints. Each of the brackets may be configured to couple with one or more camera modules. As a non-limiting example, a first bracket may be configured to couple with two camera modules, and a second bracket (that is welded to the first bracket) may be configured to couple with one camera module. The welded bracket structure may be T-shaped in various embodiments, which may enable a reduction in space consumption as compared to, e.g., a rectangular welded bracket structure. According to various embodiments, each of the first bracket and the second bracket may be formed by deep drawing a respective sheet of metal. In some embodiments, the welded bracket structure (and the techniques for forming the same) may not suffer from some manufacturing problems that may arise in other camera bracket structures, e.g., a T-shaped bracket structure formed via stamping a single sheet of metal (which may result in the metal being torn). Furthermore, the techniques described herein may reduce manufacturing costs, e.g., as compared to processes (e.g., CNC machining) used to form some other camera bracket structures.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include a welded bracket structure comprising at least two brackets that are welded together. FIG. 1 illustrates a top perspective view of an example system 100 (e.g., a multi-camera system) that includes an example of such a welded bracket structure 102 for camera modules. In various embodiments, the welded bracket structure 102 may include a first bracket 104 and a second bracket 106. As will be discussed in further detail below, the welded bracket structure 102 may include a weld joint arrangement 108 that couples the second bracket 106 with the first bracket 104. For example, the weld joint arrangement 108 may include one or more weld joints to fixedly attach a side wall of the second bracket 106 to a side wall of the first bracket 104. The example X-Y-Z coordinate system shown in FIG. 1 is used to discuss aspects of systems and/or system components, and may apply to embodiments described throughout this disclosure.

According to various embodiments, the first bracket 104 may be configured to couple with one or more camera modules (e.g., camera modules 110 and 112). Similarly, the second bracket 106 may be configured to couple with one or more other camera modules (e.g., camera module 114). FIGS. 1-4 show examples of welded bracket structures indicating that a first bracket may be coupled with two camera modules, and that a second bracket may be coupled with one camera module. However, it is understood that in various embodiments the first bracket and/or the second bracket may be coupled with fewer or more camera modules than that indicated in FIGS. 1-4.

In some embodiments, the first bracket 104 may include a top wall 116 (also referred to herein as the "first top wall 116") and one or more side walls 118 (e.g., side walls 118a-118d). The side wall(s) 118 may be oriented at a non-zero angle relative to the first top wall 116. As a non-limiting example, one or more of the side walls 118 may be orthogonal to the first top wall 116. In some examples, one or more of the side walls 118 may be oriented at a first angle relative to the first top wall 116, and another one or more of the side walls 118 may be oriented at a different, second angle relative to the first top wall 116.

The first top wall 116 may define one or more apertures, e.g., to receive at least a portion of a first set of one or more camera modules. As indicated in FIG. 1, the first top wall 116 may define a first aperture 120 and a second aperture 122. The first aperture 120 may be configured to receive at least a portion of the camera module 110. For example, the first aperture 120 may be configured to receive at least a portion of a lens barrel 124 of the camera module 110. The lens barrel 124 may hold a lens group (not shown) of the camera module 110, and the lens group may include one or more lens elements that define an optical axis of the camera module 110. The second aperture 122 may be configured to receive at least a portion of the camera module 112. For example, the second aperture 122 may be configured to receive at least a portion of a lens barrel 126 of the camera module 112. The lens barrel 126 may hold a lens group (not shown) of the camera module 112, and the lens group may include one or more lens elements that define an optical axis of the camera module 112.

In some embodiments, the second bracket 106 may include a top wall 128 (also referred to herein as the "second top wall 128") and one or more side walls 130 (e.g., side walls 130a-130d). The side wall(s) 130 may be oriented at a non-zero angle relative to the second top wall 128. As a non-limiting example, one or more of the side walls 130 may be orthogonal to the second top wall 128. In some examples, one or more of the side walls 130 may be oriented at a first angle relative to the second top wall 128, and another one or more of the side walls 130 may be oriented at a different, second angle relative to the second top wall 128.

The second top wall 128 may define one or more apertures, e.g., to receive at least a portion of a second set of one or more camera modules. As indicated in FIG. 1, the second top wall 128 may define an aperture 132. The aperture 132 may be configured to receive at least a portion of the camera module 114. For example, the aperture 132 may be configured to receive at least a portion of a lens barrel 134 of the camera module 114. The lens barrel 134 may hold a lens group (not shown) of the camera module 114, and the lens group may include one or more lens elements that define an optical axis of the camera module 114.

According to some embodiments, the first bracket 104 may be formed by deep drawing a first sheet of metal. Additionally, or alternatively, the second bracket 106 may be formed by deep drawing a second sheet of metal. However, the first bracket 104 and/or the second bracket 106 may be formed using any other suitable material and/or process. Example methods/processes for manufacturing a welded bracket structure for camera modules are described in further detail below with reference to FIGS. 3 and 5.

Figure 2:
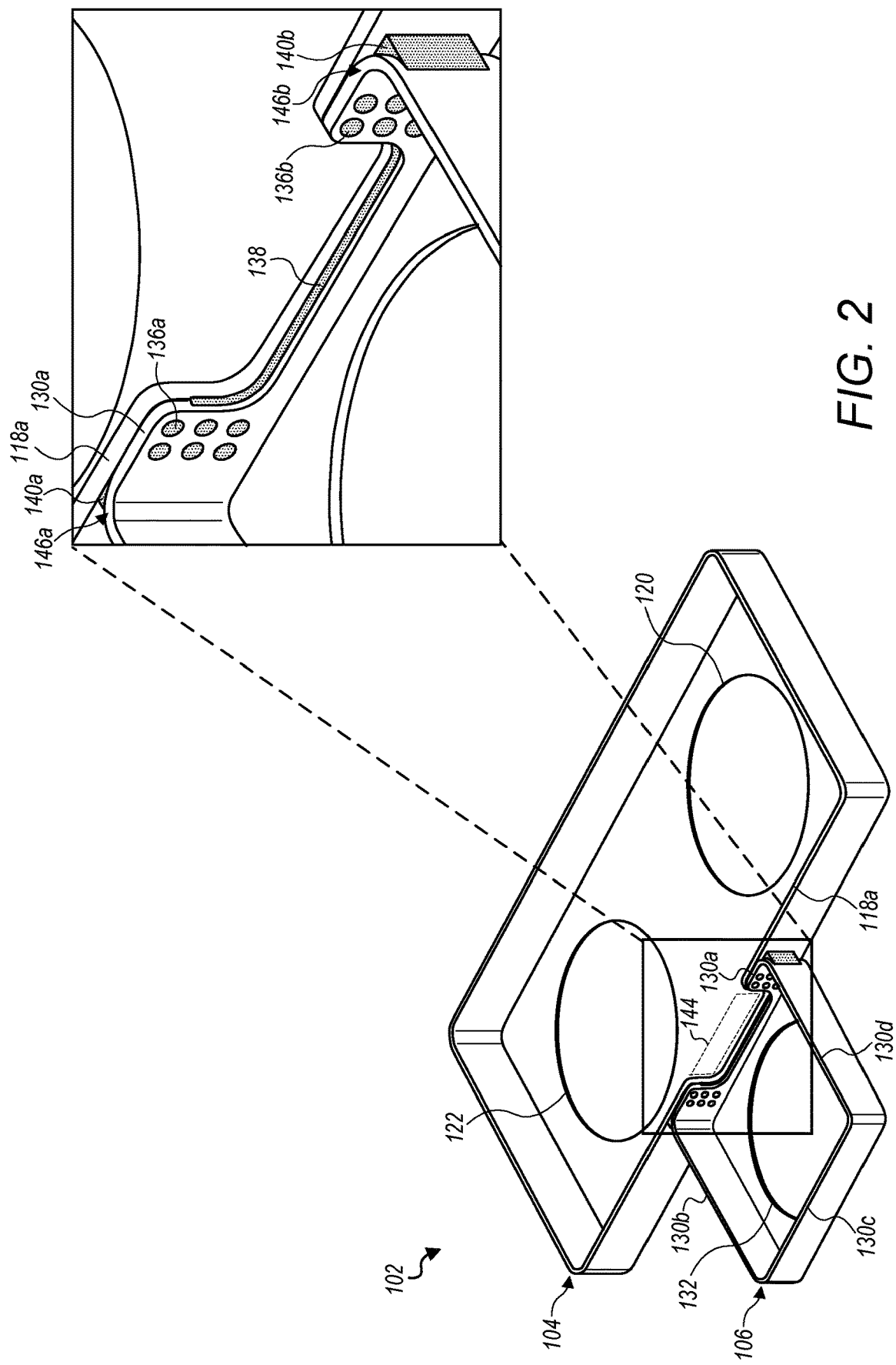
FIG. 2 illustrates a bottom perspective view of an example welded bracket structure for camera modules, in accordance with some embodiments.

As mentioned above, the welded bracket structure 102 may include a weld joint arrangement 108 that couples the second bracket 106 with the first bracket 104. FIGS. 1 and 2 illustrate an example of one such weld joint arrangement 108. In FIG. 2, a bottom perspective view of the welded bracket structure 102 (including the weld joint arrangement 108) is shown.

In some embodiments, the weld joint arrangement 108 may include one or more weld joints to fixedly attach the first bracket 104 and the second bracket to one another, e.g., such that a first side wall 118a of the first bracket 104 abuts a second side wall 130a of the second bracket 106. According to various embodiments, the weld joint(s) may include one or more spot welds 136, e.g., as indicated in FIGS. 1 and 2. For example, the weld joint(s) may include a spot weld 136 between the first side wall 118a of the first bracket 104 and the second side wall 130a of the second bracket 106. Additionally, or alternatively, the weld joint(s) may include one or more seam welds 138, e.g., as indicated in FIG. 2. For example, the weld joint(s) may include a seam weld 138 between a first edge (e.g., at least a portion of a first interior edge) of the first side wall 118a and a second edge (e.g., at least a portion of a second interior edge) of the second side wall 130a. Additionally, or alternatively, the weld joint(s) may include one or more butt welds. For example, the weld joint(s) may include a side butt weld 140 between the first side wall 118a of the first bracket 104 and a corner portion of the second bracket 106, e.g., as indicated in FIGS. 1 and 2. The corner portion may comprise a portion of the second side wall 130a and a portion of another side wall (e.g., side wall 130b) of the second bracket 106. Furthermore, the weld joint(s) may include a top edge butt weld 142 between a first edge (e.g., at least a portion of a first exterior edge) of the first side wall 118a and a second edge (e.g., at least a portion of a second exterior edge) of the second side wall 130a, e.g., as indicated in FIG. 1.

In some non-limiting examples, the weld joint(s) may include a first set of one or more spot welds 136a (see detail view in FIG. 2) at a first portion of the first side wall 118a of the first bracket 104, and a second set of one or more spot welds 136b (see detail view in FIG. 2) at a second portion of the first side wall 118a. In some examples, the first side wall 118a may define a first cutout portion, and the second side wall 130a may define a second cutout portion. The first cutout portion and the second cutout portion may be at least partially aligned with one another such that together they define a combined cutout portion (e.g., a window as generally indicated by dashed rectangle 144 in FIG. 2) between the first bracket 104 and the second bracket 106. The first set of one or more spot welds 136 may be located to a first side of the cutout portion 144, and the second set of one or more spot welds 136 may be located to a second side of the cutout portion 144. The second side may be opposite the first side. In some examples, the cutout portion 144 may be configured to allow epoxy to flow from the first bracket 104 to the second bracket 106, or vice-versa, e.g., as discussed below with reference to FIG. 4.

In some non-limiting examples, the weld joint(s) may include a seam weld 138 between a first interior edge of the first side wall 118a (of the first bracket 104) and a second interior edge of the second side wall 130a (of the second bracket 106). The first interior edge may at least partially define the first cutout portion of the first side wall 118a. The second interior edge may at least partially define the second cutout portion of the second side wall 130a. That is, the first interior edge and/or the second interior edge may define the combined cutout portion 144 in some embodiments.

In some non-limiting examples, the weld joint(s) may include side butt welds 140 and a top edge butt weld 142. A first side butt weld 140a may be produced between the first side wall 118a of the first bracket 104 and a first corner portion 146a the second bracket 106, e.g., as indicated in the detail view in FIG. 2. The first corner portion 146a may comprise a portion of the second side wall 130a and a portion of another side wall (e.g., side wall 130b). The side wall 130b (that forms part of the first corner portion 146a) may be orthogonal to the second side wall 130a and/or the second top wall 128 in some embodiments. A second side butt weld 140b may be produced between the first side wall 118a of the first bracket 104 and a second corner portion 146b of the second bracket 106, e.g., as indicated in the detail view in FIG. 2. The second corner portion 146b may comprise a portion of the second side wall 130a and a portion of another side wall (e.g., side wall 130d). The side wall 130d that forms part of the second corner portion 146b may be opposite the side wall 130b that forms part of the first corner portion 146a. The top edge butt weld 142 may be produced between a first exterior edge of the first side wall 118a and a second exterior edge of the second side wall 130a, e.g., as indicated in FIG. 1. In some embodiments, the first exterior edge and the first interior edge of the first side wall 118a may be opposite one another. Similarly, the second exterior edge and the second interior edge of the second side wall 130a may be opposite one another in some embodiments.

In various embodiments, the weld joint arrangement 108 (e.g., the spot weld(s) 136, the seam weld(s) 138, the side butt weld(s) 140, and/or the top edge butt weld(s) 142) may be configured to counteract forces (e.g., pull, torque, etc.) imposed on the welded bracket structure 102, such that the first bracket 104 and the second bracket 106 are maintained securely attached to one another. In some examples, the spot weld(s) 136 may be used to bring the first bracket 104 and the second bracket 106 together, e.g., such that the respective geometries of the first side wall 118a and the second side wall 130a abut one another. That is, the spot weld(s) 136 may be produced before the other types of weld joints in some non-limiting examples. In various examples, the first bracket 104 and the second bracket 106 may be welded to one another (e.g., via the weld joint arrangement 108) with the target of having no gaps between the first side wall 118a and the second side wall 130a. In some cases, gaps between the first side wall 118a and the second side wall 130a may negatively impact accuracy in the manufacturing and/or assembling of the welded bracket structure 102. Additionally, or alternatively, gaps between the first side wall 118a and the second side wall 130a may negatively impact accuracy of alignment between camera modules coupled to the welded bracket structure 102. As discussed below with reference to FIG. 4, epoxy may be dispensed (e.g., in an epoxy potting process) into a multi-camera system that includes a welded bracket structure, such as welded bracket structure 102. According to some examples, the seam weld(s) 138 may also function as a seal between interior edges of the first side wall 118a and the second side wall 130a, which may prevent epoxy from flowing through any gaps between the first side wall 118a and the second side wall 130a.

Figure 3:
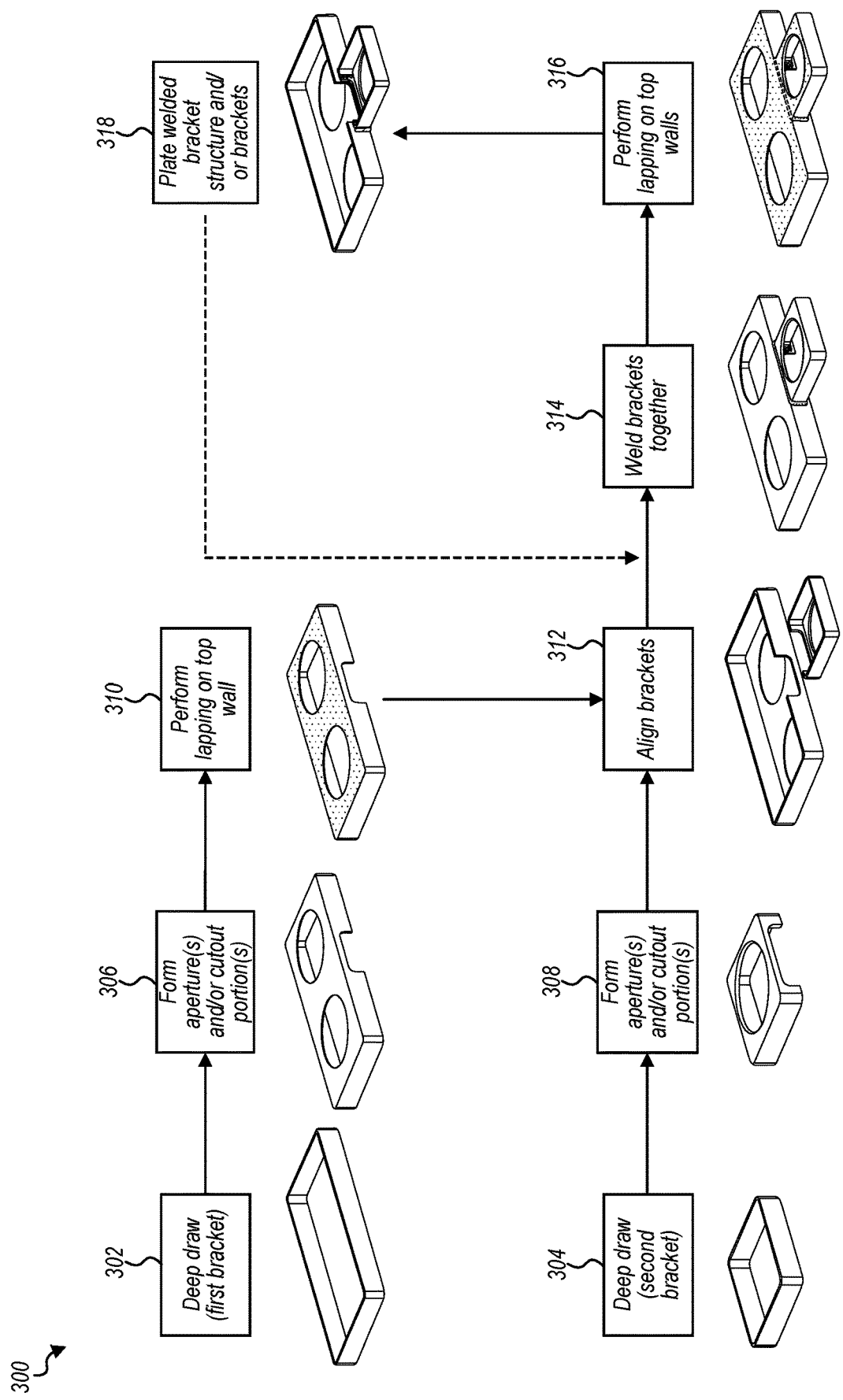
FIG. 3 illustrates an example process flow for manufacturing and/or assembling a welded bracket structure for camera modules, in accordance with some embodiments.

FIG. 3 illustrates an example process flow 300 for manufacturing and/or assembling a welded bracket structure for camera modules, such as the welded bracket structure 102 described above with reference to FIGS. 1 and 2. At 302, the process 300 may include deep drawing a first sheet of metal (e.g., stainless steel, copper alloy, etc.) to form, at least in part, a first bracket (e.g., first bracket 104 in FIGS. 1 and 2) of the welded bracket structure. At 304, the process 300 may include deep drawing a second sheet of metal (e.g., stainless steel, copper alloy, etc.) to form, at least in part, a second bracket (e.g., second bracket 106 in FIGS. 1 and 2) of the welded bracket structure.

At 306, the process 300 may include forming aperture(s) and/or cutout portion(s) on the first bracket. At 308, the process 300 may include forming aperture(s) and/or cutout portion(s) on the second bracket. In some non-limiting examples, the aperture(s) and/or cutout portion(s) may be formed by performing one or more piercing and/or punching operations on the first bracket and/or the second bracket.

At 310, the process 300 may include performing one or more lapping operations (e.g., rotational grinding) on a first top wall (e.g., the first top wall 116 in FIG. 1) of the first bracket. The lapping operation(s) may be performed to reduce the thickness of the first top wall of the first bracket. In some embodiments, the first top wall thickness may be reduced so that the first top wall has a different wall thickness than a second top wall (e.g., the second top wall 128 in FIG. 1) of the second bracket. Different top wall thicknesses may be desirable, e.g., where camera modules being coupled with the welded bracket structure vary in size (e.g., in the height dimension along the Z-axis). While FIG. 3 indicates that a lapping operation may be performed (at 310) on the first top wall of the first bracket, in some embodiments the process 300 may additionally, or alternatively, include performing a lapping operation on the second top wall of the second bracket.

At 312, the process 300 may include aligning the first bracket with the second bracket. For example, each of the first bracket and the second bracket may be positioned in respective attachment orientations so that they may be attached to one another, e.g., via welding. In some examples, a first cutout portion of the first bracket may be aligned with a second cutout portion of the second bracket. The first cutout portion may be defined by a first side wall (e.g., the first side wall 118a in FIG. 1) of the first bracket. The second cutout portion may be defined by a second side wall (e.g., the second side wall 130a in FIG. 1) of the second bracket.

At 314, the process 300 may include welding the first bracket and the second bracket together. In various examples, the first bracket and the second bracket may be welded together via a weld joint arrangement (e.g., weld joint arrangement 108 described above with reference to FIGS. 1 and 2) that includes one or more weld joints to fixedly attach the first side wall of the first bracket to a second side wall of the second bracket. Non-limiting examples of weld joints that may be used to weld the brackets together are described herein with reference to FIGS. 1, 2, and 5.

At 316, the process 300 may include performing one or more lapping operations on the first top wall of the first bracket and the second top wall of the second bracket, e.g., after the brackets have been welded together. The lapping operation(s) may be performed to ensure that the first top wall of the first bracket is flush with the second top wall of the second bracket. That is, in some embodiments the first top wall may be coplanar with the second top wall as a result of the lapping operation(s).

At 318, the process 300 may include plating the welded bracket structure. For example, the welded bracket structure may be plated with a material (e.g., nickel) to prevent corrosion, e.g., if the first bracket and/or the second bracket are formed of a material that is susceptible to corrosion (e.g., copper). In some examples, the plating may additionally, or alternatively, be performed on the first bracket and/or the second bracket individually, e.g., before the welding (at 314) as indicated by the dashed arrow in FIG. 3. In some embodiments, the additional layer of material resulting from the plating may improve the bending strength of the weld joints produced to weld the first bracket and the second bracket together.

Figure 4:
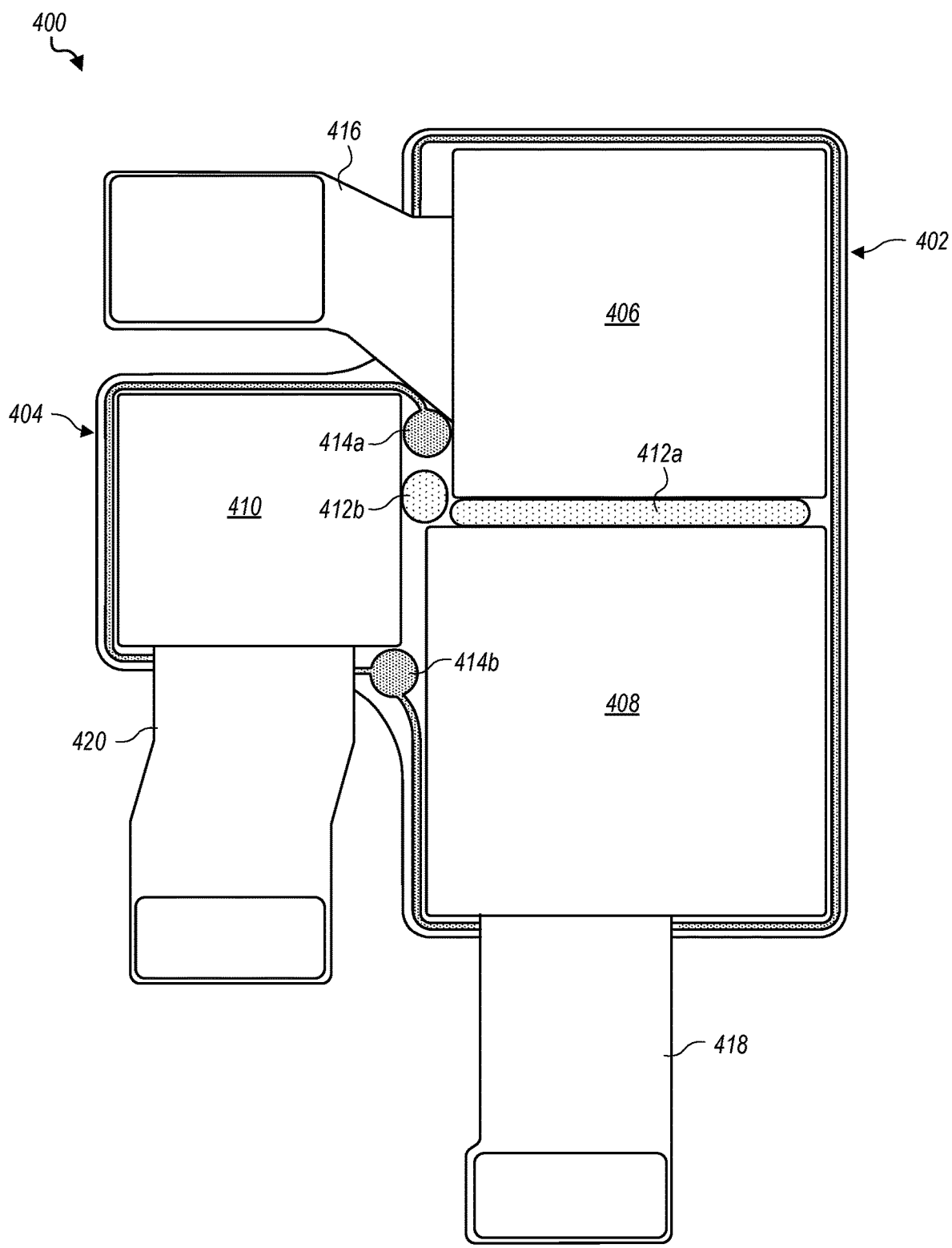
FIG. 4 illustrates an example epoxy arrangement for a multi-camera system that includes a welded bracket structure for camera modules, in accordance with some embodiments.

As mentioned above, in various embodiments a welded bracket structure may include a cutout portion that may allow epoxy to flow from a first bracket to a second bracket, or vice-versa. FIG. 4 illustrates an example epoxy arrangement 400 for a multi-camera system that includes a welded bracket structure for camera modules. In FIG. 4, a bottom view of an example multi-camera system is shown.

The welded bracket structure may include a first bracket 402 and a second bracket 404. While not shown in FIG. 4, the welded bracket structure may include a weld joint arrangement, e.g., as described herein with reference to FIGS. 1-3 and 5. In various embodiments, the welded bracket structure may be "T-shaped," e.g., as shown in FIG. 4.

In some examples, the multi-camera system may include a first camera module 406, a second camera module 408, and a third camera module 410. The first bracket 402 may at least partially encompass the first camera module 406 and the second camera module 408, e.g., such that they are adjacent to each other. The second bracket 404 may at least partially encompass the third camera module 410. In some embodiments, the multi-camera system of FIG. 4 may be the same as, or similar to, the system 100 of FIG. 1.

According to various embodiments, the epoxy arrangement 400 may include a first epoxy 412 and/or a second epoxy 414. The first epoxy 412 and the second epoxy 414 may be different types of epoxies in some embodiments. In some non-limiting examples, the first epoxy 412 (e.g., a silver epoxy) may be used to electrically ground the welded bracket structure to the camera modules, and the second epoxy 414 may comprise a thermal epoxy.

In some examples, the first epoxy 412 may include one or more first portions 412a that provide an electrical connection between the welded bracket structure and the camera modules for the first bracket 402, e.g., to ground the welded bracket structure to those camera modules for electromagnetic interference (EMI) purposes. For example, the first portion(s) 412a may contact the first bracket 402 and a respective component (e.g., a shield can, a stiffener, etc.) of each of the first camera module 406 and the second camera module 408. Furthermore, the first epoxy 412 may include one or more second portions 412b that provide an electrical connection between the welded bracket structure and the camera modules for the second bracket 404, e.g., to ground the welded bracket structure to those camera modules for EMI purposes. For example, the second portion(s) 412*b* may contact the second bracket 404 and a component (e.g., a shield can, a stiffener, etc.) of the third camera module 410.

In some examples, the second epoxy 414 (e.g., a thermal epoxy) may be dispensed into the multi-camera system, e.g., in an epoxy potting process. A needle may be used to inject the second epoxy 414 into the multi-camera system via one or more injections points, such as the first injection point 414*a* and the second injection point 414*b* indicated in FIG. 4. The second epoxy 414 may be a low viscosity epoxy, and the second epoxy 414 may flow around the sides of the camera modules via capillary effect in some embodiments. The second epoxy 414 may flow between the first bracket 402 and the second bracket 404 via a cutout portion (not shown), or window, e.g., a cutout portion defined by abutting side walls of the first bracket 402 and the second bracket 404, such as the cutout portion 144 described above with reference to FIGS. 1 and 2.

In some embodiments, the first epoxy 412 and the second epoxy 414 may be dispensed into the multi-camera system after one or more of the camera modules are actively aligned. In performing such active alignment, the welded bracket structure may be used as a reference to align camera modules with one another. For example, the first camera module 406 (and/or the second camera module 408) may be placed in the welded bracket structure, and the third camera module 410 may be actively aligned to the first camera module 406 (and/or the second camera module 408). An ultraviolet (UV) flash epoxy (not shown) may be used during the active alignment process to mount the camera modules to the welded bracket structure. In some examples, the first epoxy 412 may be dispensed during a time period after the UV flash epoxy is dispensed and before the second epoxy 414 is dispensed. According to some examples, the second epoxy 414 may be dispensed (e.g., using the first injection point 414*a* and/or the second injection point 414*b* for potting) to produce a thermal fill that encompasses the camera modules. The second epoxy 414 may be dispensed until it reaches a particular height of the wall (e.g., the full height), which may increase rigidity and improve reliability of the multi-camera system.

According to some embodiments, each of the camera modules may include a flex circuit board. For example, the first camera module 406 may include a first flex circuit board 416, the second camera module 408 may include a second flex circuit board 418, and the third camera module 410 may include a third flex circuit board 420. The flex circuit boards may convey signals (e.g. power and/or control signals) from the respective camera modules to one or more other components outside of the welded bracket structure. In a non-limiting example, the multi-camera system may be included in a mobile device, and the flex circuit boards may convey signals from the respective camera modules to one or more components (e.g., processor(s), controller(s), etc.) of the mobile device that are external to the welded bracket structure.

Figure 5:
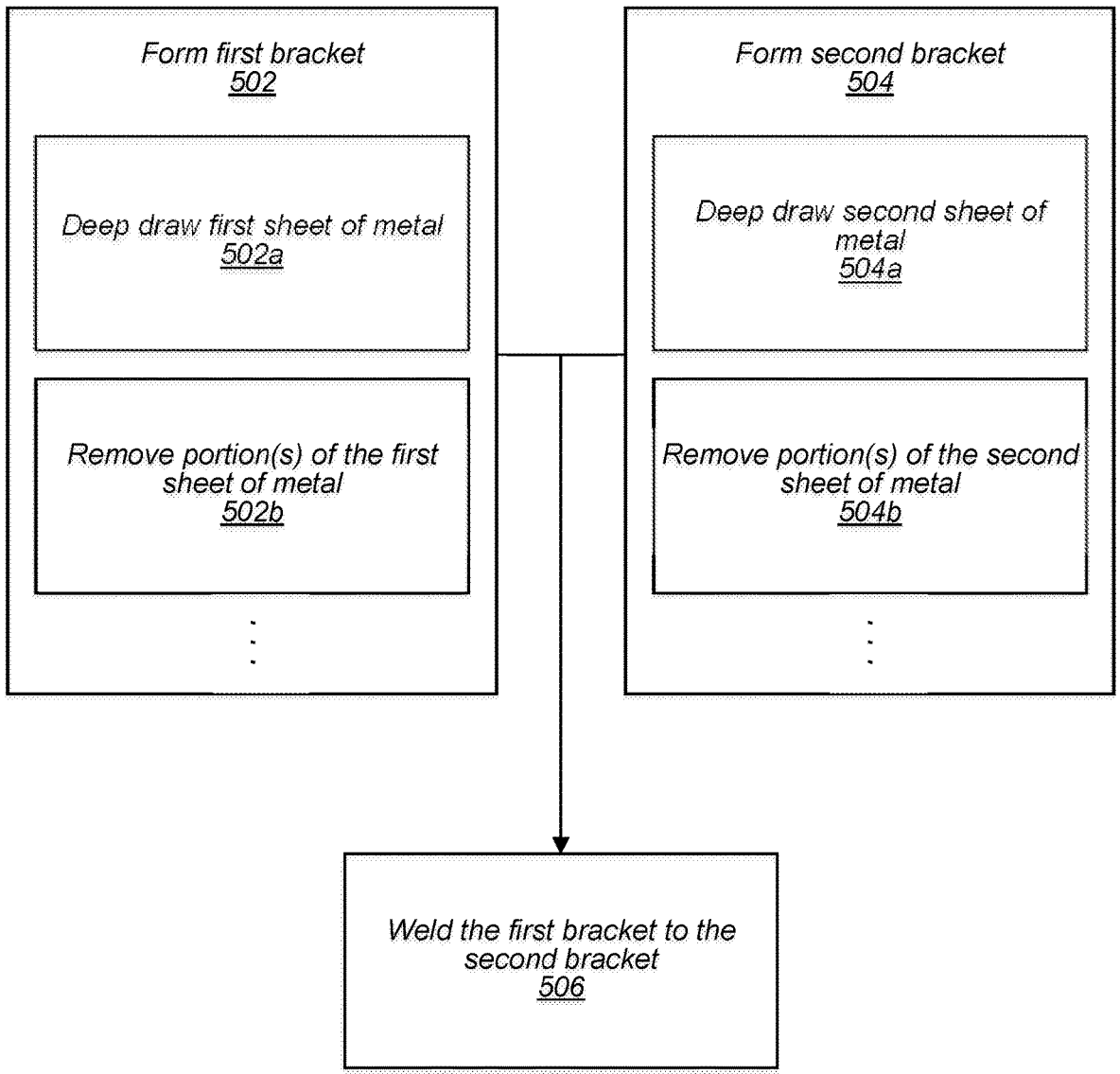
FIG. 5 is a flow chart of an example method for forming a welded bracket structure for camera modules, in accordance with some embodiments.

FIG. 5 is a flow chart of an example method 500 for forming a welded bracket structure for camera modules. At 502, the method 500 may include forming a first bracket of the welded bracket structure. For example, at 502*a*, forming the first bracket may include deep drawing a first sheet of metal. In some embodiments, forming the first bracket may include removing one or more portions of the first sheet of metal, at 502*b*. In various examples, one or more portions of the first sheet of metal may be removed to form one or more apertures, one or more cutout portions, and/or one or more reduced wall thicknesses, e.g., as described above with reference to FIGS. 1-3. In some examples, one or more portions of the first sheet of metal may be removed before the first sheet of metal is deep drawn (at 502*a*). Additionally, or alternatively, one or more portions of the first sheet of metal may be removed after the first sheet of metal is deep drawn (at 502*a*).

At 504, the method 500 may include forming a second bracket of the welded bracket structure. For example, at 504*a*, forming the second bracket may include deep drawing a second sheet of metal. In some embodiments, forming the second bracket may include removing one or more portions of the second sheet of metal, at 504*b*. In various examples, one or more portions of the second sheet of metal may be removed to form one or more apertures, one or more cutout portions, and/or one or more reduced wall thicknesses, e.g., as described above with reference to FIGS. 1-3. In some examples, one or more portions of the second sheet of metal may be removed before the second sheet of metal is deep drawn (at 504*a*). Additionally, or alternatively, one or more portions of the second sheet of metal may be removed after the second sheet of metal is deep drawn (at 504*a*).

At 506, the method 500 may include welding the first bracket to the second bracket. In some examples, welding the first bracket to the second bracket may produce one or more weld joints that fixedly attach the first bracket to the second bracket, e.g., such that a first side wall of the first bracket abuts a second side wall of the second bracket. The first side wall may be adjacent a first top wall of the first bracket. The first top wall may define a first set of one or more apertures (e.g., apertures formed at 502*b*) to receive at least a portion of a first set of one or more camera modules. The second side wall may be adjacent a second top wall of the second bracket. The second top wall may define a second set of one or more apertures (e.g., an aperture formed at 504*b*) to receive at least a portion of a second set of one or more camera modules.

According to various examples, the welding the first bracket to the second bracket may include producing one or more spot welds, one or more seam welds, and/or one or more butt welds. The spot weld(s) may include a first spot weld and/or a second spot weld produced between the first side wall of the first bracket and the second side wall of the second bracket. The first spot weld may be located to a first side of a first cutout portion of the first bracket. The second spot weld may be located to a second side of the first cutout portion, the second side being opposite the first side. The seam weld(s) may include a seam weld produced between a first edge of the first side wall and a second edge of the second side wall. In some examples, the first edge may at least partially define the first cutout portion, and the second edge may at least partially define a second cutout portion of the second bracket. The butt weld(s) may include a first side butt weld, a second side butt weld, and/or a top edge butt weld. The first side butt weld may be produced between the first side wall of the first bracket and a first corner portion of the second bracket. The first corner portion may comprise a portion of the second side wall and a portion of a third side wall that is orthogonal to the second side wall and the second top wall. The second side butt weld may be produced between the first side wall of the first bracket and a second corner portion of the second bracket. The second corner portion may comprise another portion of the second side wall and a portion of a fourth side wall that is opposite the third side wall. The top edge butt weld may be produced between a first exterior edge of the first side wall and a second exterior edge of the second side wall.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 6:
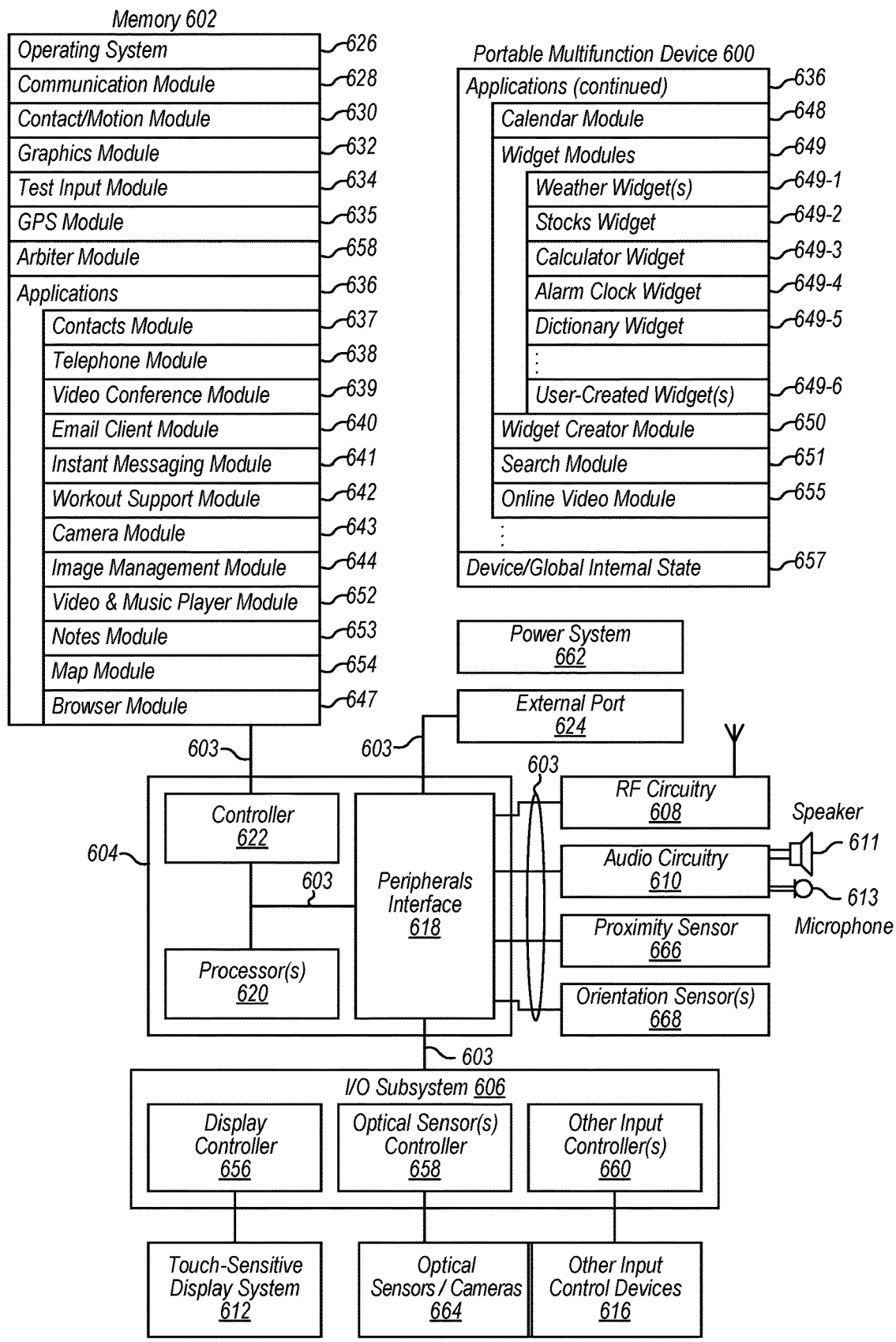
FIG. 6 illustrates a block diagram of a portable multifunction device that may include a welded bracket structure for camera modules, in accordance with some embodiments.

Attention is now directed toward embodiments of portable devices with cameras. FIG. 6 illustrates a block diagram of an example portable multifunction device 600 that may include one or more welded bracket structures and/or cameras (e.g., the welded bracket structures and/or camera modules described above with reference to FIGS. 1-5), in accordance with some embodiments. Cameras 664 are sometimes called "optical sensors" for convenience, and may also be known as or called an optical sensor system. Device 600 may include memory 602 (which may include one or more computer readable storage mediums), memory controller 622, one or more processing units (CPUs) 620, peripherals interface 618, RF circuitry 608, audio circuitry 610, speaker 611, touch-sensitive display system 612, microphone 613, input/output (I/O) subsystem 606, other input or control devices 616, and external port 624. Device 600 may include multiple optical sensors 664. These components may communicate over one or more communication buses or signal lines 603.

It should be appreciated that device 600 is only one example of a portable multifunction device, and that device 600 may have more or fewer components than shown, may combine two or more components, or may have a different configuration or arrangement of the components. The various components shown in FIG. 6 may be implemented in hardware, software, or a combination of hardware and software, including one or more signal processing and/or application specific integrated circuits.

Memory 602 may include high-speed random access memory and may also include non-volatile memory, such as one or more magnetic disk storage devices, flash memory devices, or other non-volatile solid-state memory devices. Access to memory 602 by other components of device 600, such as CPU 620 and the peripherals interface 618, may be controlled by memory controller 622.

Peripherals interface 618 can be used to couple input and output peripherals of the device to CPU 620 and memory 602. The one or more processors 620 run or execute various software programs and/or sets of instructions stored in memory 602 to perform various functions for device 600 and to process data.

In some embodiments, peripherals interface 618, CPU 620, and memory controller 622 may be implemented on a single chip, such as chip 604. In some other embodiments, they may be implemented on separate chips.

RF (radio frequency) circuitry 608 receives and sends RF signals, also called electromagnetic signals. RF circuitry 608 converts electrical signals to/from electromagnetic signals and communicates with communications networks and other communications devices via the electromagnetic signals. RF circuitry 608 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 608 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 610, speaker 611, and microphone 613 provide an audio interface between a user and device 600.

Audio circuitry 610 receives audio data from peripherals interface 618, converts the audio data to an electrical signal, and transmits the electrical signal to speaker 611. Speaker 611 converts the electrical signal to human-audible sound waves. Audio circuitry 610 also receives electrical signals converted by microphone 613 from sound waves. Audio circuitry 610 converts the electrical signal to audio data and transmits the audio data to peripherals interface 618 for processing. Audio data may be retrieved from and/or transmitted to memory 602 and/or RF circuitry 608 by peripherals interface 618. In some embodiments, audio circuitry 610 also includes a headset jack (e.g., 712, FIG. 7). The headset jack provides an interface between audio circuitry 610 and removable audio input/output peripherals, such as output-only headphones or a headset with both output (e.g., a headphone for one or both ears) and input (e.g., a microphone).

I/O subsystem 606 couples input/output peripherals on device 600, such as touch screen 612 and other input control devices 616, to peripherals interface 618. I/O subsystem 606 may include display controller 656 and one or more input controllers 660 for other input or control devices. The one or more input controllers 660 receive/send electrical signals from/to other input or control devices 616. The other input control devices 616 may include physical buttons (e.g., push buttons, rocker buttons, etc.), dials, slider switches, joysticks, click wheels, and so forth. In some alternate embodiments, input controller(s) 660 may be coupled to any (or none) of the following: a keyboard, infrared port, USB port, and a pointer device such as a mouse. The one or more buttons (e.g., 708, FIG. 7) may include an up/down button for volume control of speaker 611 and/or microphone 613. The one or more buttons may include a push button (e.g., 706, FIG. 7).

Touch-sensitive display 612 provides an input interface and an output interface between the device and a user. Display controller 656 receives and/or sends electrical signals from/to touch screen 612. Touch screen 612 displays visual output to the user. The visual output may include graphics, text, icons, video, and any combination thereof (collectively termed "graphics"). In some embodiments, some or all of the visual output may correspond to user-interface objects.

Touch screen 612 has a touch-sensitive surface, sensor or set of sensors that accepts input from the user based on haptic and/or tactile contact. Touch screen 612 and display controller 656 (along with any associated modules and/or sets of instructions in memory 602) detect contact (and any movement or breaking of the contact) on touch screen 612 and converts the detected contact into interaction with user-interface objects (e.g., one or more soft keys, icons, web pages or images) that are displayed on touch screen 612. In an example embodiment, a point of contact between touch screen 612 and the user corresponds to a finger of the user.

Touch screen 612 may use LCD (liquid crystal display) technology, LPD (light emitting polymer display) technology, or LED (light emitting diode) technology, although other display technologies may be used in other embodiments. Touch screen 612 and display controller 656 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 612. In an example embodiment, projected mutual capacitance sensing technology is used, such as that found in the iPhone®, iPod Touch®, and iPad® from Apple Inc. of Cupertino, California.

Touch screen 612 may have a video resolution in excess of 800 dpi. In some embodiments, the touch screen has a video resolution of approximately 860 dpi. The user may make contact with touch screen 612 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 600 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 612 or an extension of the touch-sensitive surface formed by the touch screen.

Device 600 also includes power system 662 for powering the various components. Power system 662 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 600 may also include one or more optical sensors or cameras 664. FIG. 6 shows an optical sensor 664 coupled to optical sensor controller 658 in I/O subsystem 606. Optical sensor 664 may include charge-coupled device (CCD) or complementary metal-oxide semiconductor (CMOS) phototransistors. Optical sensor 664 receives light from the environment, projected through one or more lens, and converts the light to data representing an image. In conjunction with imaging module 643 (also called a camera module), optical sensor 664 may capture still images or video. In some embodiments, an optical sensor 664 is located on the back of device 600, opposite touch screen display 612 on the front of the device, so that the touch screen display 612 may be used as a viewfinder for still and/or video image acquisition. In some embodiments, another optical sensor is located on the front of the device so that the user's image may be obtained for videoconferencing while the user views the other video conference participants on the touch screen display.

Device 600 may also include one or more proximity sensors 666. FIG. 6 shows proximity sensor 666 coupled to peripherals interface 618. Alternately, proximity sensor 666 may be coupled to input controller 660 in I/O subsystem 606. In some embodiments, the proximity sensor 666 turns off and disables touch screen 612 when the multifunction device 600 is placed near the user's ear (e.g., when the user is making a phone call).

Device 600 includes one or more orientation sensors 668. In some embodiments, the one or more orientation sensors 668 include one or more accelerometers (e.g., one or more linear accelerometers and/or one or more rotational accelerometers). In some embodiments, the one or more orientation sensors 668 include one or more gyroscopes. In some embodiments, the one or more orientation sensors 668 include one or more magnetometers. In some embodiments, the one or more orientation sensors 668 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 600. In some embodiments, the one or more orientation sensors 668 include any combination of orientation/rotation sensors. FIG. 6 shows the one or more orientation sensors 668 coupled to peripherals interface 618. Alternately, the one or more orientation sensors 668 may be coupled to an input controller 660 in I/O subsystem 606. In some embodiments, information is displayed on the touch screen display 612 in a portrait view or a landscape view based on an analysis of data received from the one or more orientation sensors 668.

In some embodiments, the software components stored in memory 602 include operating system 626, communication module (or set of instructions) 628, contact/motion module (or set of instructions) 630, graphics module (or set of instructions) 632, text input module (or set of instructions) 634, Global Positioning System (GPS) module (or set of instructions) 635, arbiter module 658 and applications (or sets of instructions) 636. Furthermore, in some embodiments memory 602 stores device/global internal state 657. Device/global internal state 657 includes one or more of: active application state, indicating which applications, if any, are currently active; display state, indicating what applications, views or other information occupy various regions of touch screen display 612; sensor state, including information obtained from the device's various sensors and input control devices 616; and location information concerning the device's location and/or attitude.

Operating system 626 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 628 facilitates communication with other devices over one or more external ports 624 and also includes various software components for handling data received by RF circuitry 608 and/or external port 624. External port 624 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 630 may detect contact with touch screen 612 (in conjunction with display controller 656) and other touch sensitive devices (e.g., a touchpad or physical click wheel). Contact/motion module 630 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 630 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 630 and display controller 656 detect contact on a touchpad.

Contact/motion module 630 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 632 includes various known software components for rendering and displaying graphics on touch screen 612 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 632 stores data representing graphics to be used. Each graphic may be assigned a corresponding code. Graphics module 632 receives, from applications etc., one or more codes specifying graphics to be displayed along with, if necessary, coordinate data and other graphic property data, and then generates screen image data to output to display controller 656.

Text input module 634, which may be a component of graphics module 632, provides soft keyboards for entering text in various applications (e.g., contacts 637, e-mail 640, IM 641, browser 647, and any other application that needs text input).

GPS module 635 determines the location of the device and provides this information for use in various applications (e.g., to telephone module 638 for use in location-based dialing, to camera module 643 as picture/video metadata, and to applications that provide location-based services such as weather widgets, local yellow page widgets, and map/navigation widgets).

Applications 636 may include the following modules (or sets of instructions), or a subset or superset thereof:
- contacts module 637 (sometimes called an address book or contact list);
- telephone module 638;
- video conferencing module 639;
- e-mail client module 640;
- instant messaging (IM) module 641;
- workout support module 642;
- camera module 643 for still and/or video images;
- image management module 644;
- browser module 647;
- calendar module 648;
- widget modules 649, which may include one or more of: weather widget 649-1, stocks widget 649-2, calculator widget 649-3, alarm clock widget 649-4, dictionary widget 649-5, and other widgets obtained by the user, as well as user-created widgets 649-6;
- widget creator module 650 for making user-created widgets 649-6;
- search module 651;

video and music player module 652, which may be made up of a video player module and a music player module;

notes module 653;

map module 654; and/or online video module 655.

Examples of other applications 636 that may be stored in memory 602 include other word processing applications, other image editing applications, drawing applications, presentation applications, JAVA-enabled applications, encryption, digital rights management, voice recognition, and voice replication.

In conjunction with touch screen 612, display controller 656, contact module 630, graphics module 632, and text input module 634, contacts module 637 may be used to manage an address book or contact list (e.g., stored in application internal state 657), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 638, video conference 639, e-mail 640, or IM 641; and so forth.

In conjunction with RF circuitry 608, audio circuitry 610, speaker 611, microphone 613, touch screen 612, display controller 656, contact module 630, graphics module 632, and text input module 634, telephone module 638 may be used to enter a sequence of characters corresponding to a telephone number, access one or more telephone numbers in address book 637, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 608, audio circuitry 610, speaker 611, microphone 613, touch screen 612, display controller 656, optical sensor 664, optical sensor controller 658, contact module 630, graphics module 632, text input module 634, contact list 637, and telephone module 638, videoconferencing module 639 includes executable instructions to initiate, conduct, and terminate a video conference between a user and one or more other participants in accordance with user instructions.

In conjunction with RF circuitry 608, touch screen 612, display controller 656, contact module 630, graphics module 632, and text input module 634, e-mail client module 640 includes executable instructions to create, send, receive, and manage e-mail in response to user instructions. In conjunction with image management module 644, e-mail client module 640 makes it very easy to create and send e-mails with still or video images taken with camera module 643.

In conjunction with RF circuitry 608, touch screen 612, display controller 656, contact module 630, graphics module 632, and text input module 634, the instant messaging module 641 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 608, touch screen 612, display controller 656, contact module 630, graphics module 632, text input module 634, GPS module 635, map module 654, and music player module 646, workout support module 642 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 612, display controller 656, optical sensor(s) 664, optical sensor controller 658, contact module 630, graphics module 632, and image management module 644, camera module 643 includes executable instructions to capture still images or video (including a video stream) and store them into memory 602, modify characteristics of a still image or video, or delete a still image or video from memory 602.

In conjunction with touch screen 612, display controller 656, contact module 630, graphics module 632, text input module 634, and camera module 643, image management module 644 includes executable instructions to arrange, modify (e.g., edit), or otherwise manipulate, label, delete, present (e.g., in a digital slide show or album), and store still and/or video images.

In conjunction with RF circuitry 608, touch screen 612, display system controller 656, contact module 630, graphics module 632, and text input module 634, browser module 647 includes executable instructions to browse the Internet in accordance with user instructions, including searching, linking to, receiving, and displaying web pages or portions thereof, as well as attachments and other files linked to web pages.

In conjunction with RF circuitry 608, touch screen 612, display system controller 656, contact module 630, graphics module 632, text input module 634, e-mail client module 640, and browser module 647, calendar module 648 includes executable instructions to create, display, modify, and store calendars and data associated with calendars (e.g., calendar entries, to do lists, etc.) in accordance with user instructions.

In conjunction with RF circuitry 608, touch screen 612, display system controller 656, contact module 630, graphics module 632, text input module 634, and browser module 647, widget modules 649 are mini-applications that may be downloaded and used by a user (e.g., weather widget 549-1, stocks widget 549-2, calculator widget 649-3, alarm clock widget 649-4, and dictionary widget 649-5) or created by the user (e.g., user-created widget 649-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 608, touch screen 612, display system controller 656, contact module 630, graphics module 632, text input module 634, and browser module 647, the widget creator module 650 may be used by a user to create widgets (e.g., turning a user-specified portion of a web page into a widget).

In conjunction with touch screen 612, display system controller 656, contact module 630, graphics module 632, and text input module 634, search module 651 includes executable instructions to search for text, music, sound, image, video, and/or other files in memory 602 that match one or more search criteria (e.g., one or more user-specified search terms) in accordance with user instructions.

In conjunction with touch screen 612, display system controller 656, contact module 630, graphics module 632, audio circuitry 610, speaker 611, RF circuitry 608, and browser module 647, video and music player module 652 includes executable instructions that allow the user to download and play back recorded music and other sound files stored in one or more file formats, such as MP3 or AAC files, and executable instructions to display, present or otherwise play back videos (e.g., on touch screen 612 or on an external, connected display via external port 624). In some embodiments, device 600 may include the functionality of an MP3 player.

In conjunction with touch screen 612, display controller 656, contact module 630, graphics module 632, and text input module 634, notes module 653 includes executable instructions to create and manage notes, to do lists, and the like in accordance with user instructions.

In conjunction with RF circuitry 608, touch screen 612, display system controller 656, contact module 630, graphics module 632, text input module 634, GPS module 635, and browser module 647, map module 654 may be used to receive, display, modify, and store maps and data associated with maps (e.g., driving directions; data on stores and other points of interest at or near a particular location; and other location-based data) in accordance with user instructions.

In conjunction with touch screen 612, display system controller 656, contact module 630, graphics module 632, audio circuitry 610, speaker 611, RF circuitry 608, text input module 634, e-mail client module 640, and browser module 647, online video module 655 includes instructions that allow the user to access, browse, receive (e.g., by streaming and/or download), play back (e.g., on the touch screen or on an external, connected display via external port 624), send an e-mail with a link to a particular online video, and otherwise manage online videos in one or more file formats, such as H.264. In some embodiments, instant messaging module 641, rather than e-mail client module 640, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 602 may store a subset of the modules and data structures identified above. Furthermore, memory 602 may store additional modules and data structures not described above.

In some embodiments, device 600 is a device where operation of a predefined set of functions on the device is performed exclusively through a touch screen and/or a touchpad. By using a touch screen and/or a touchpad as the primary input control device for operation of device 600, the number of physical input control devices (such as push buttons, dials, and the like) on device 600 may be reduced.

The predefined set of functions that may be performed exclusively through a touch screen and/or a touchpad include navigation between user interfaces. In some embodiments, the touchpad, when touched by the user, navigates device 600 to a main, home, or root menu from any user interface that may be displayed on device 600. In such embodiments, the touchpad may be referred to as a "menu button." In some other embodiments, the menu button may be a physical push button or other physical input control device instead of a touchpad.

Figure 7:
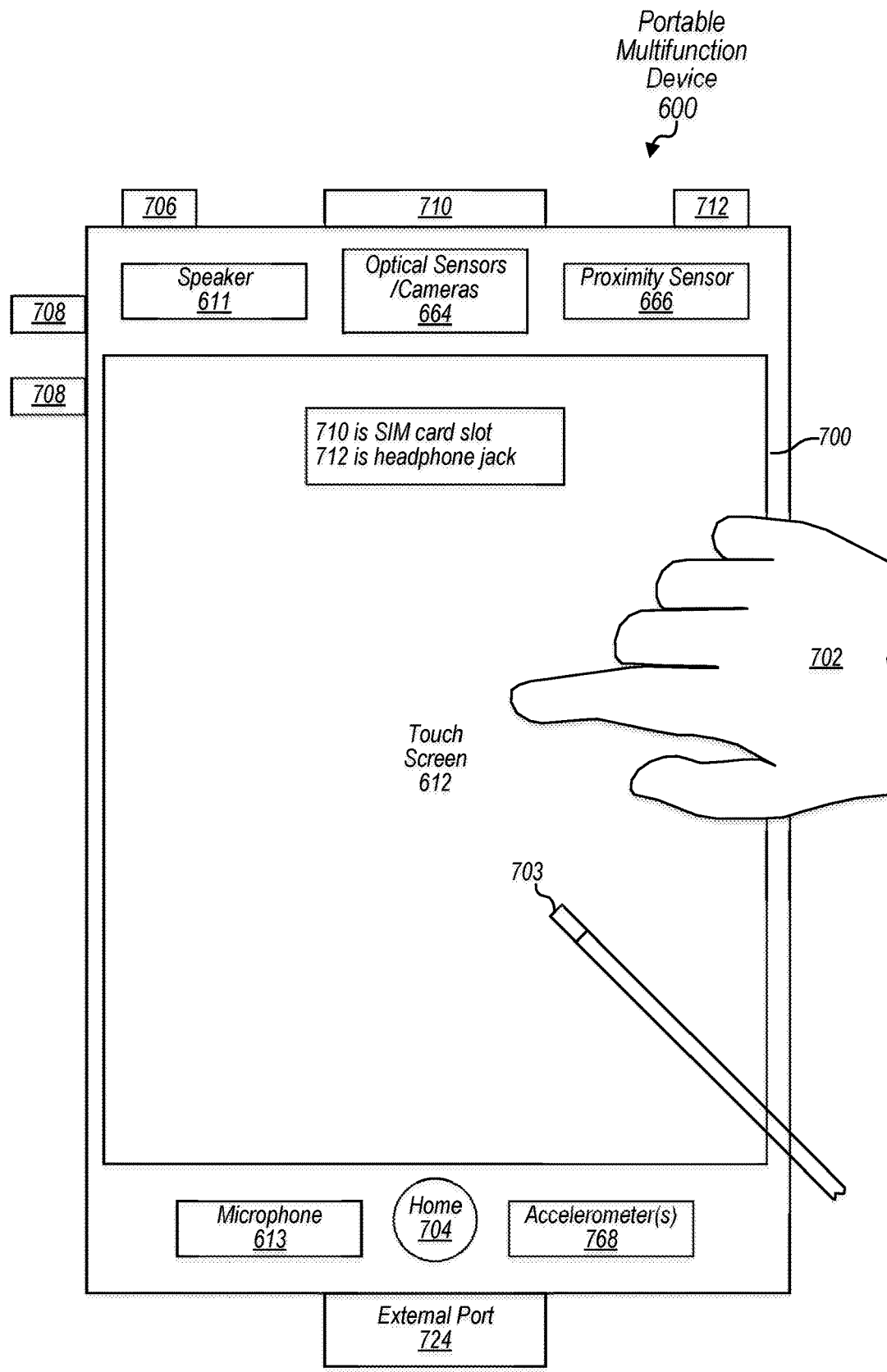
FIG. 7 depicts a portable multifunction device that may include a welded bracket structure for camera modules, in accordance with some embodiments.

FIG. 7 depicts illustrates an example portable multifunction device 600 that may include one or more welded bracket structures and/or cameras (e.g., the welded bracket structures and/or camera modules described above with reference to FIGS. 1-5), in accordance with some embodiments. The device 600 may have a touch screen 612. The touch screen 612 may display one or more graphics within user interface (UI) 700. In this embodiment, as well as others described below, a user may select one or more of the graphics by making a gesture on the graphics, for example, with one or more fingers 702 (not drawn to scale in the figure) or one or more styluses 703 (not drawn to scale in the figure).

Device 600 may also include one or more physical buttons, such as "home" or menu button 704. As described previously, menu button 704 may be used to navigate to any application 636 in a set of applications that may be executed on device 600. Alternatively, in some embodiments, the menu button 704 is implemented as a soft key in a GUI displayed on touch screen 612.

In one embodiment, device 600 includes touch screen 612, menu button 704, push button 706 for powering the device on/off and locking the device, volume adjustment button(s) 708, Subscriber Identity Module (SIM) card slot 710, head set jack 712, and docking/charging external port 724. Push button 706 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 600 also may accept verbal input for activation or deactivation of some functions through microphone 613.

It should be noted that, although many of the examples herein are given with reference to optical sensor(s)/camera(s) 664 (on the front of a device), one or more rear-facing cameras or optical sensors that are pointed opposite from the display may be used instead of, or in addition to, an optical sensor(s)/camera(s) 664 on the front of a device.

Example Computer System

Figure 8:
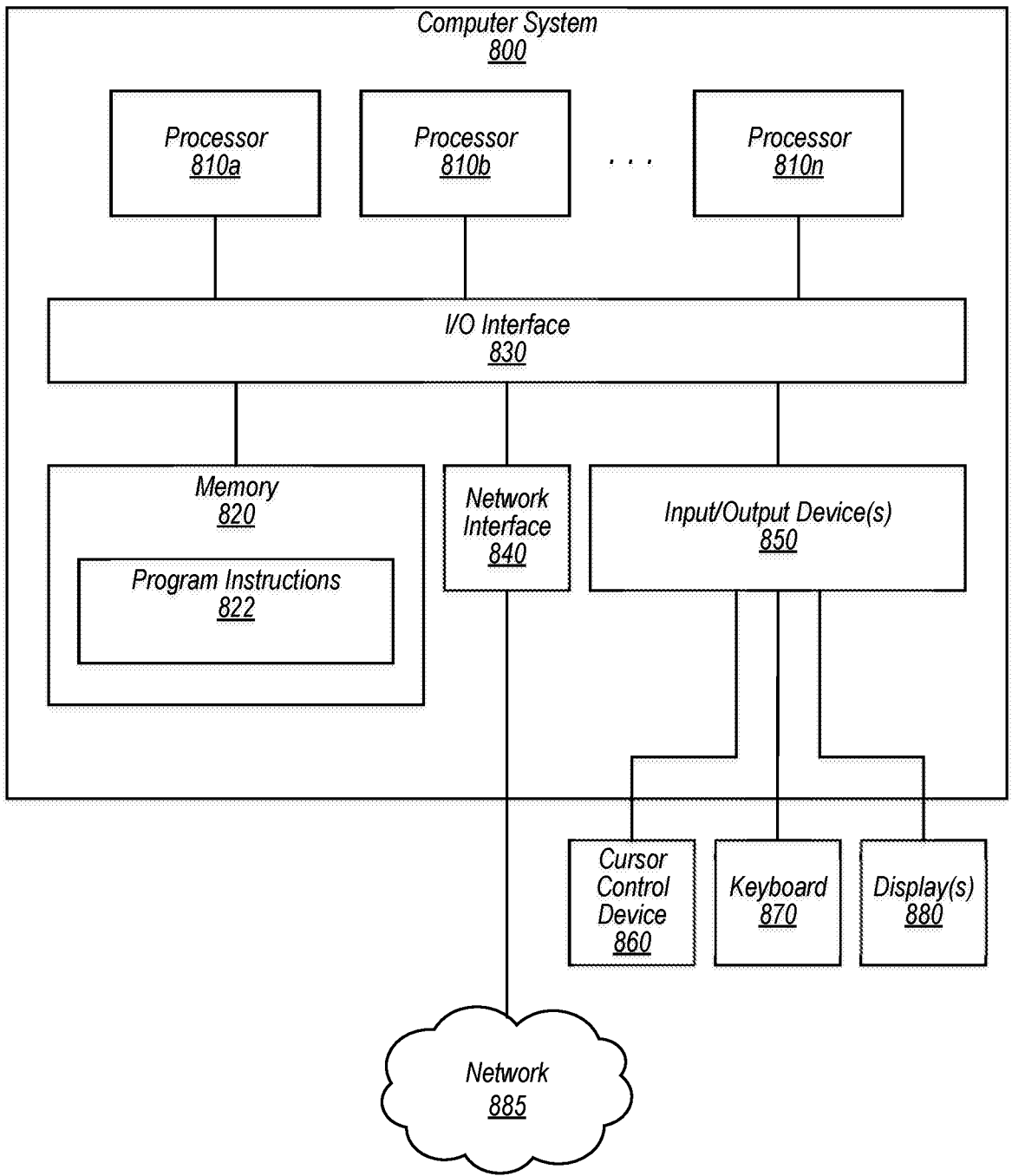
FIG. 8 illustrates an example computer system that may include a welded bracket structure for camera modules, in accordance with some embodiments.

FIG. 8 illustrates an example computer system 800 that may include one or more welded bracket structures and/or cameras (e.g., the welded bracket structures and/or camera modules described above with reference to FIGS. 1-5), according to some embodiments. The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 800, which may interact with various other devices. Note that any component, action, or functionality described above with respect to FIGS. 1-7 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store camera control program instructions 822 and/or camera control data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 may be configured to implement a lens control application 824 incorporating any of the functionality described above. Additionally, existing camera control data 832 of memory 820 may include any of the information or data structures described above. In some embodiments, program instructions and/or data may be received, sent or stored upon different types of computer-accessible media or on similar media separate from system memory 820 or computer system 800. While computer system 800 is described as implementing the functionality of functional blocks of previous Figures, any of the functionality described herein may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822, which may be processor-executable to implement any element or action described above. In one embodiment, the program instructions may implement the methods described above. In other embodiments, different elements and data may be included. Note that data may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A bracket structure for camera modules, the bracket structure comprising: a first bracket, comprising: a first top wall defining a first set of one or more apertures to receive at least a portion of a first set of one or more camera modules; and a first side wall adjacent the first top wall; a second bracket, comprising: a second top wall defining a second set of one or more apertures to receive at least a portion of a second set of one or more camera modules; and a second side wall adjacent the second top wall; and one or more weld joints to fixedly attach the second bracket to the first bracket such that the second side wall abuts the first side wall.

Clause 2: The bracket structure of Clause 1, wherein: the first bracket is formed by deep drawing a first sheet of metal; and the second bracket is formed by deep drawing a second sheet of metal.

Clause 3: The bracket structure of any of Clauses 1-2, wherein the one or more weld joints comprise at least one of: a spot weld between the first side wall of the first bracket and the second side wall of the second bracket; a seam weld between a first interior edge of the first side wall and a second interior edge of the second side wall; a first butt weld between the first side wall and a corner portion of the second bracket, wherein the corner portion comprises a portion of the second side wall and a portion of a third side wall that is orthogonal to the second side wall and the second top wall of the second bracket; or a second butt weld between a first exterior edge of the first side wall and a second exterior edge of the second side wall.

Clause 4: The bracket structure of Clause 3, wherein: the one or more weld joints comprise: the spot weld; the seam weld; the first butt weld; and the second butt weld; the first exterior edge is opposite the first interior edge with respect to the first side wall; and the second exterior edge is opposite the second interior edge with respect to the second side wall.

Clause 5: The bracket structure of any of Clauses 1-4, wherein: the first side wall of the first bracket is orthogonal to the first top wall of the first bracket and parallel to the second side wall of the second bracket; and the second side wall is orthogonal to the second top wall.

Clause 6: A device, comprising: one or more processors; memory storing program instructions executable by the one or more processors to control operation of one or more cameras of a multi-camera system; the multi-camera system, comprising: a plurality of camera modules, comprising: a first set of one or more camera modules; and a second set of one or more camera modules; and a bracket structure for the plurality of camera modules, the bracket structure comprising: a first bracket, comprising: a first top wall defining a first set of one or more apertures to receive at least a portion of the first set of one or more camera modules; and a first side wall adjacent the first top wall; a second bracket, comprising: a second top wall defining a second set of one or more apertures to receive at least a portion of the second set of one or more camera modules; and a second side wall adjacent the second top wall; and one or more weld joints to fixedly attach the second bracket to the first bracket such that the second side wall abuts the first side wall.

Clause 7: The device of Clause 6, wherein: the first bracket is formed by deep drawing a first sheet of metal; and the second bracket is formed by deep drawing a second sheet of metal.

Clause 8: The device of any of Clauses 6-7, wherein the one or more weld joints comprise: a spot weld; a seam weld; and a butt weld.

Clause 9: The device of any of Clauses 6-8, wherein the one or more weld joints comprise a spot weld between the first side wall of the first bracket and the second side wall of the second bracket.

Clause 10: The device of any of Clauses 6-9, wherein the one or more weld joints comprise a seam weld between a first edge of the first side wall and a second edge of the second side wall.

Clause 11: The device of any of Clauses 6-10, wherein the one or more weld joints comprise: a first butt weld between the first side wall and a corner portion of the second bracket, wherein the corner portion comprises a portion of the second side wall and a portion of a third side wall that is orthogonal to the second side wall and the second top wall of the second bracket; and a second butt weld between a first exterior edge of the first side wall and a second exterior edge of the second side wall.

Clause 12: The device of any of Clauses 6-11, wherein: the first set of one or more camera modules comprises: a first camera module, comprising: a first lens group comprising one or more lens elements; and a first lens barrel to hold the first lens group; and a second camera module, comprising: a second lens group comprising one or more lens elements; and a second lens barrel to hold the second lens group; and the first set of one or more apertures comprises: a first aperture for receiving at least a portion of the first lens barrel; and a second aperture for receiving at least a portion of the second lens barrel.

Clause 13: The device of Clause 12, wherein: the second set of one or more camera modules comprises: a third camera module, comprising: a third lens group comprising one or more lens elements; and a third lens barrel to hold the third lens group; and the second set of one or more apertures comprises: a third aperture for receiving at least a portion of the third lens barrel.

Clause 14: The device of Clause 13, wherein the one or more weld joints fixedly attach the second bracket to the first bracket such that a plane intersecting a central axis of the third aperture is located between the first aperture and the second aperture.

Clause 15: The device of any of Clauses 13-14, further comprising an epoxy that electrically grounds the welded bracket structure to the first camera module, the second camera module, and the third camera module.

Clause 16: The device of Clause 15, wherein: the epoxy comprises a silver epoxy; the device further comprises a thermal epoxy; and the first side wall and the second side wall define a cutout portion configured to allow at least one of the silver epoxy or the thermal epoxy to flow from the first bracket to the second bracket or from the second bracket to the first bracket.

Clause 17: A method of forming a bracket structure for camera modules, the method comprising: welding a first bracket to a second bracket to produce one or more weld joints that fixedly attach the first bracket to the second bracket, such that a first side wall of the first bracket abuts a second side wall of the second bracket, wherein: the first side wall is adjacent a first top wall of the first bracket, the first top wall to define a first set of one or more apertures to receive at least a portion of a first set of one or more camera modules; and the second side wall is adjacent a second top wall of the second bracket, the second top wall to define a second set of one or more apertures to receive at least a portion of a second set of one or more camera modules.

Clause 18: The method of Clause 17, further comprising: forming the first bracket, wherein the forming the first bracket comprises deep drawing a first sheet of metal; and forming the second bracket, wherein the forming the second bracket comprises deep drawing a second sheet of metal.

Clause 19: The method of Clause 18, wherein: the forming the first bracket further comprises removing a portion of the first side wall such that the first side wall defines a first cutout portion; the forming the second bracket further comprises removing a portion of the second side wall such that the second side wall defines a second cutout portion; and the method further comprises: lapping a portion of at least one of the first top wall or the second top wall, such that: the first top wall has a first thickness; and the second top wall has a second thickness that is different than the first thickness.

Clause 20: The method of Clause 19, wherein the welding comprises: producing a first spot weld between the first side wall of the first bracket and the second side wall of the second bracket, wherein the first spot weld is located to a first side of the first cutout portion; producing a second spot weld between the first side wall of the first bracket and the second side wall of the second bracket, wherein the second spot weld is located to a second side of the first cutout portion, and the second side is opposite the first side; producing a seam weld between a first interior edge of the first side wall and a second interior edge of the second side wall, wherein: the first interior edge at least partially defines the first cutout portion; and the second interior edge at least partially defines the second cutout portion; producing a first side butt weld between the first side wall and a first corner portion of the second bracket, wherein the first corner portion comprises a portion of the second side wall and a portion of a third side wall that is orthogonal to the second side wall and the second top wall; and producing a second side butt weld between the first side wall and a second corner portion of the second bracket, wherein the second corner portion comprises another portion of the second side wall and a portion of a fourth side wall that is opposite the third side wall; and producing a top edge butt weld between a first exterior edge of the first side wall and a second exterior edge of the second side wall.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A bracket structure for camera modules, the bracket structure comprising:
   a first deep drawn bracket, comprising:
      a first top wall defining a first set of one or more apertures to receive at least a portion of a first set of one or more camera modules, and
      a first side wall adjacent the first top wall;
   a second deep drawn bracket, comprising:
      a second top wall defining a second set of one or more apertures to receive at least a portion of a second set of one or more camera modules, and
      a second side wall adjacent the second top wall; and
   a weld joint arrangement including two or more different types of weld joints, wherein each of the two or more different types of weld joints joins the first side wall to the second side wall to fixedly attach the second deep drawn bracket to the first deep drawn bracket such that the second side wall abuts the first side wall, wherein the two or more different types of weld joints are configured to counter both pull and torque forces between the first deep drawn bracket and the second deep drawn bracket.

2. The bracket structure of claim 1, wherein:
   the first deep drawn bracket is formed by deep drawing a first sheet of metal; and
   the second deep drawn bracket is formed by deep drawing a second sheet of metal.

3. The bracket structure of claim 1, wherein the two or more different types of weld joints comprise at least two of:
   a spot weld between the first side wall of the first deep drawn bracket and the second side wall of the second deep drawn bracket;
   a seam weld between a first interior edge of the first side wall and a second interior edge of the second side wall;
   a first butt weld between the first side wall and a corner portion of the second deep drawn bracket, wherein the corner portion comprises a portion of the second side wall and a portion of a third side wall that is orthogonal to the second side wall and the second top wall of the second deep drawn bracket; or
a second butt weld between a first exterior edge of the first side wall and a second exterior edge of the second side wall.

4. The bracket structure of claim 3, wherein:
the two or more different types of weld joints comprise at least two of:
the spot weld;
the seam weld;
the first butt weld; and
the second butt weld;
the first exterior edge is opposite the first interior edge with respect to the first side wall; and
the second exterior edge is opposite the second interior edge with respect to the second side wall.

5. The bracket structure of claim 1, wherein:
the first side wall of the first deep drawn bracket is orthogonal to the first top wall of the first deep drawn bracket and parallel to the second side wall of the second deep drawn bracket; and
the second side wall is orthogonal to the second top wall.

6. A device, comprising:
one or more processors;
memory storing program instructions executable by the one or more processors to control operation of one or more cameras of a multi-camera system;
the multi-camera system, comprising:
a plurality of camera modules, comprising:
a first set of at least one camera module; and
a second set of one or more camera modules; and
a bracket structure for the plurality of camera modules, the bracket structure comprising:
a first deep drawn bracket, comprising:
a first top wall defining a first set of at least one aperture to receive at least a portion of a first set of one or more camera modules, and
a first side wall adjacent the first top wall;
a second deep drawn bracket, comprising:
a second top wall defining a second set of one or more apertures to receive at least a portion of the second set of one or more camera modules, and
a second side wall adjacent the second top wall; and
a weld joint arrangement including two or more different types of weld joints, wherein each of the two or more different types of weld joints joins the first side wall to the second side wall to fixedly attach the second deep drawn bracket to the first deep drawn bracket such that the second side wall abuts the first side wall, wherein the two or more different types of weld joints are configured to counter both pull and torque forces between the first deep drawn bracket and the second deep drawn bracket.

7. The device of claim 6, wherein:
the first deep drawn bracket is formed by deep drawing a first sheet of metal; and
the second deep drawn bracket is formed by deep drawing a second sheet of metal.

8. The device of claim 6, wherein the two or more different types of weld joints comprise at least two of:
a spot weld;
a seam weld; or
a butt weld.

9. The device of claim 6, wherein the two or more different types of weld joints comprise a spot weld between the first side wall of the first deep drawn bracket and the second side wall of the second deep drawn bracket.

10. The device of claim 6, wherein the two or more different types of weld joints comprise a seam weld between a first edge of the first side wall and a second edge of the second side wall.

11. The device of claim 6, wherein the two or more different types of weld joints comprise:
a first butt weld between the first side wall and a corner portion of the second deep drawn bracket, wherein the corner portion comprises a portion of the second side wall and a portion of a third side wall that is orthogonal to the second side wall and the second top wall of the second deep drawn bracket; and
a second butt weld between a first exterior edge of the first side wall and a second exterior edge of the second side wall.

12. The device of claim 6, wherein:
the first set of at least two camera modules comprises:
a first camera module, comprising:
a first lens group comprising one or more lens elements; and
a first lens barrel to hold the first lens group; and
a second camera module, comprising:
a second lens group comprising one or more lens elements; and
a second lens barrel to hold the second lens group; and
the first set of at least two apertures comprises:
a first aperture for receiving at least a portion of the first lens barrel; and
a second aperture for receiving at least a portion of the second lens barrel.

13. The device of claim 12, wherein:
the second set of one or more camera modules comprises:
a third camera module, comprising:
a third lens group comprising one or more lens elements; and
a third lens barrel to hold the third lens group; and
the second set of one or more apertures comprises:
a third aperture for receiving at least a portion of the third lens barrel.

14. The device of claim 13, wherein the two or more different types of weld joints fixedly attach the second deep drawn bracket to the first deep drawn bracket such that a plane intersecting a central axis of the third aperture is located between the first aperture and the second aperture.

15. The device of claim 13, further comprising an epoxy that electrically grounds the bracket structure to the first camera module, the second camera module, and the third camera module.

16. The device of claim 15, wherein:
the epoxy comprises a silver epoxy;
the device further comprises a thermal epoxy; and
the first side wall and the second side wall define a cutout portion configured to allow at least one of the silver epoxy or the thermal epoxy to flow from the first deep drawn bracket to the second deep drawn bracket or from the second deep drawn bracket to the first deep drawn bracket.

17. A multi-camera system comprising:
a bracket structure comprising a first bracket welded to a second bracket, via one or more weld joints, such that a first side wall of the first bracket abuts a second side wall of the second bracket, wherein:

the first side wall is adjacent a first top wall of the first bracket, the first top wall to define a first set of at least two apertures to receive at least a portion of a first set of at least two camera modules, and the second side wall is adjacent a second top wall of the second bracket, the second top wall to define a second set of one or more apertures to receive at least a portion of a second set of one or more camera modules;

at least one camera module of the first set of at least two camera modules mounted, using an epoxy, into at least one aperture of the first set of at least two apertures; and at least one camera module of the second set of one or more camera modules mounted, using the epoxy, into at least one aperture of the second set of one or more apertures, wherein the at least one camera module of the first set of at least two camera modules in the at least one aperture of the first set of at least two apertures is aligned with the at least one camera module of the second set of one or more camera modules in the at least one aperture of the second set of one or more apertures based on a reference position of the bracket structure.

18. The multi-camera system of claim 17, wherein the epoxy comprises an ultraviolet (UV) flash epoxy.

19. The multi-camera system of claim 17, further comprising one or more portions of a first epoxy dispensed in the bracket structure to provide an electrical connection between the bracket structure and the camera modules.

20. The multi-camera system of claim 17, further comprising one or more portions of a second epoxy dispensed in the bracket structure at least around sides of the camera modules forming a thermal fill that encompasses at least a portion of the respective camera modules.

\* \* \* \* \*